United States Patent

[11] 3,523,558

[72] Inventors Lucien François Simon Tissot-Dupont, deceased, late of Paris, France, by André Pierre François Tissot-Dupont, heir and legal representative, Paris, France
[21] Appl. No. 689,238
[22] Filed Nov. 24, 1967
[45] Patented Aug. 11, 1970
continuation in-part of Ser. No. 385,260, filed July 27, 1964, abandoned.
[73] Assignee S. T. Dupont
Societe Anonyme, Paris, France
[32] Priority July 31, 1963
[33] France
[31] 943,290

[54] METERING VALVE
12 Claims, 16 Drawing Figs.
[52] U.S. Cl. ..................................................... 138/43, 431/344
[51] Int. Cl. ..................................................... F15d 1/04, F23d 13/04

[50] Field of Search ........................................... 67/7.1H

[56] References Cited
UNITED STATES PATENTS
2,743,579 5/1956 Newman ...................... 67/7.1(H)UX
2,750,774 6/1956 Perlin ............................ 67/7.1(H)UX
2,895,318 7/1959 Zellweger..................... 67/7.1(H)UX
3,140,593 7/1964 Bauman ........................ 67/7.1(H)UX
3,141,317 7/1964 Segawa......................... 67/7.1(H)UX Primary Examiner— Edward J. Michael
Attorney— Edwin E. Greigg ABSTRACT: A metering valve particularly for use in gas cigarette lighters, a manually operable driving member connected to a driven member the displacement of which causes compression of a porous pad affecting the rate of gas flow; between the driving member and the driven member there is provided a step-down connection of variable ratio; further means are provided to cause a total disengagement between the two members when said pad is in a predetermined state of maximum compression.

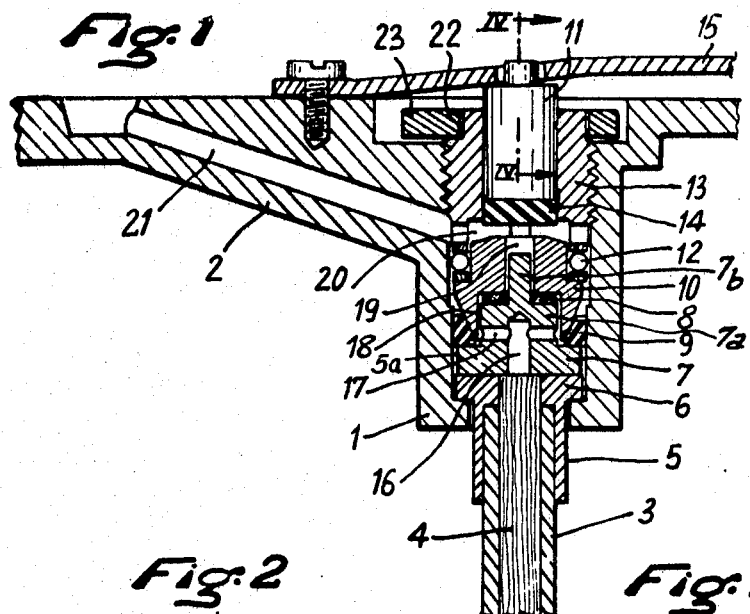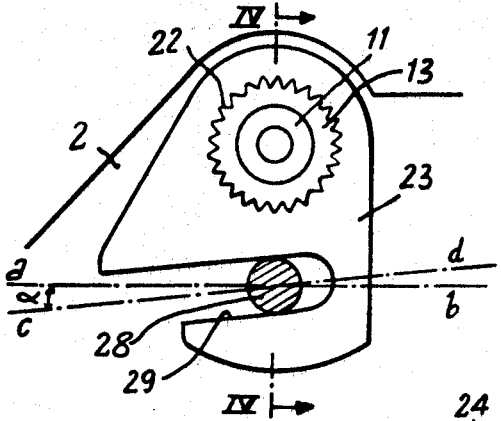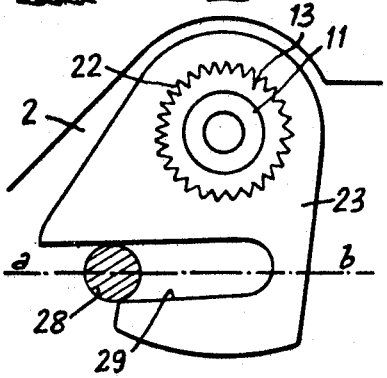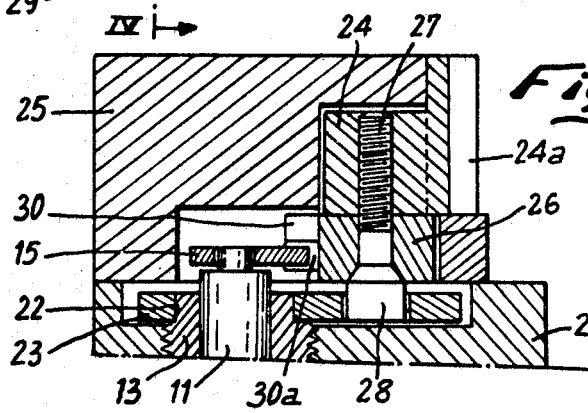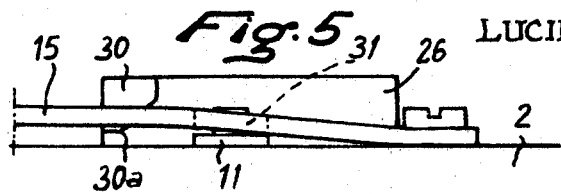
INVENTOR
LUCIEN FRANCOIS SIMON TISSOT-DUPONT
BY
EDWIN E. GREIGG
ATTORNEY

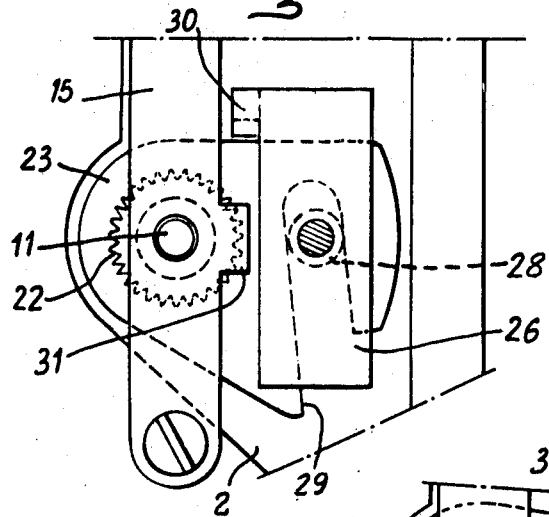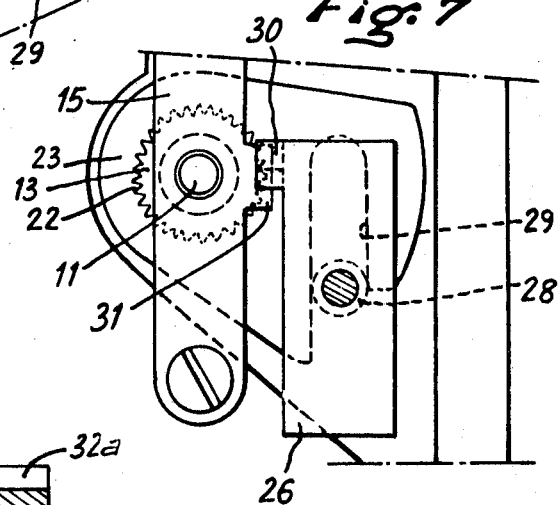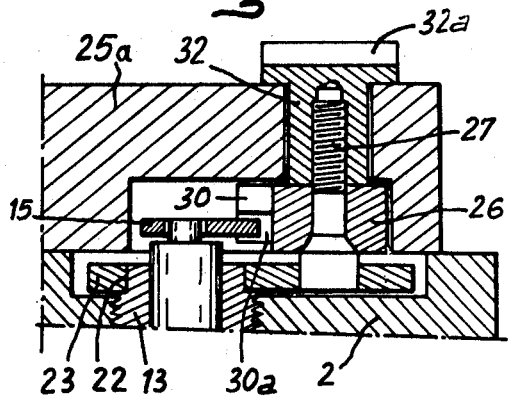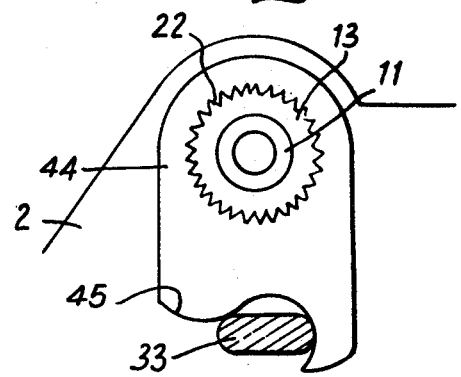

Patented Aug. 11, 1970 3,523,558

Sheet _3_ of 5

INVENTOR
LUCIEN FRANCOIS SIMON TISSOT·DUPONT

BY
EDWIN E. GREIGG
ATTORNEY

INVENTOR
LUCIEN FRANCOIS SIMON TISSOT-DUPONT
BY
EDWIN E. GREIGG
ATTORNEY

Patented Aug. 11, 1970

INVENTOR
LUCIEN FRANCOIS SIMON TISSOT-DUPONT
BY Edwin E. Greigg
ATTORNEY

METERING VALVE

This is a continuation-in-part of application Ser. No. 385,260, filed July 27, 1964, now abandoned.

This invention relates to an improved metering valve for regulating the rate of gas flow and finds particular application in gas fuel cigarette lighters for controlling the gas flow to the burner outlet of said lighter.

The adjustment of the flame in gas lighters, that is, the variation of the flow rate of gas is generally obtained by changing the volume of a small pad of compressible porous material through which the gas passes during its expansion.

To this end, said pad is disposed between two walls adapted to be shifted toward or away from each other. The displacement is very small and is of a magnitude of 1/100 of a millimeter.

In the usual structures used heretofore one of the said walls is made integral with a threaded carrier member adapted to be screwed for adjustment into a boss formed on the container to which the other wall is affixed. The threaded member carries a knurled or notched disc through the manual rotation of which control is effected.

This prior solution has the drawback in that the small displacement to be obtained requires either a thread having a very small pitch or an elastic member absorbing a fraction of the displacement or else, a control mechanism to shift the two walls by differential threads. All these solutions involve relatively very high costs.

In non-automatic lighters it is highly desirable to place the manual control of the adjustment at a distance from the member driving the ignition wheel in order to prevent any accidental change in adjustment. This requirement urges the manufacturer either to reduce the diameter of the adjusting disc which makes its use inconvenient, or else to insert the adjusting pad nearer the center of the lighter. In this latter case the disc, if it is to be more easily handled and the finger of the operator is to be at a safe distance from the flame, should have a diameter which is substantially larger then the thickness of the lighter. This leads to an unsightly shape of the cover and if the disc is not shielded, there is a risk of accidental adjustment through friction.

It is known that the flow rate of gas in cigarette lighters of the aforenoted type may be manually adjusted to such an extent that the height of the flame may vary from between approximately 1 to 100 millimeters. In cigarette lighters known heretofore the fineness of adjustment has been substantially uniform throughout the entire range of gas flow. It is, however, a desideratum-not solved in lighters of the prior art-to increase the fineness of adjustment of the gas rate flow with decreasing flame height.

Furthermore, in known structures as outlined above, there is no provision for a reliable and accurate stop means at the end of the operative stroke so that the user risks crushing completely the pad and consequently rendering it useless. Abutments that prevent the advance of a threaded member beyond a predetermined point have a disadvantage in that due to the wear of the material, the stopping point gradually changes during the lifetime of the lighter.

In order to obviate the above-noted disadvantages, it is an object of the invention to provide an improved metering valve assembly of inexpensive structure for particular use in gas cigarette lighters wherein the manual control means of said valve enable the user to make infinitesimal adjustments in said metering device.

It is another object of the invention to provide an improved metering valve assembly for particular use in gas cigarette lighters wherein the fineness of gas flow control progressively increases as the height of the flame decreases.

It is a further object of the invention to provide an improved metering valve assembly for particular use in gas cigarette lighters wherein improved stop means are provided to prevent the advancement of a pressure member beyond a predetermined point.

Briefly stated, the metering valve according to the invention comprises a compressible porous pad disposed within and extending across the flow path of the gas to be metered, a threaded carrier member rotatably displaceable to urge a pressure member toward or away from said pad to vary the extent of its compression by said pressure member and manually operable control means connected to, but not unitary with, the threaded carrier member to impart said rotary motion thereto. In order to cause gradually decreasing incremental displacements of the pressure member by equal excursions of the manual driving means as the gas flow rate drops to low levels, there is provided a step-down connection of varying ratio between the manual means and the threaded carrier member. Stated in different terms, the fineness of the flame adjustment is gradually increased as the height of the flame gradually decreases. This step-down connection may be e.g. a cam and follower assembly, a slotted linkage structure or a worn gear mechanism. To prevent the crushing of the pad by the pressure member, means are provided in said connection to disengage the manual driving means from the carrier member at a predetermined point of maximum displacement and maintaining the carrier in said position of maximum displacement until reverse movement of the manual means to retract the carrier member is initiated.

The invention will be better understood and further objects and advantages will become more apparent from the ensuing detailed specification of several exemplary embodiments taken in conjunction with the drawings wherein:

FIG. 1 is an enlarged sectional elevational view of the metering valve proper of one embodiment;

FIGS. 2 and 3 are plan views illustrating in two different positions a cam and follower structure of the same embodiment;

FIG. 4 is a sectional view through line IV--IV of FIGS. 1 and 2;

FIG. 5 is a partial elevational view as seen from the side opposed to that illustrated in FIG. 1;

FIGS. 6 and 7 are plan views (with some parts removed) illustrating two different positions of the embodiment shown in FIGS. 1 5;

FIG. 8 is a sectional view similar to FIG. 4 but showing a slightly different embodiment;

Figure 13:
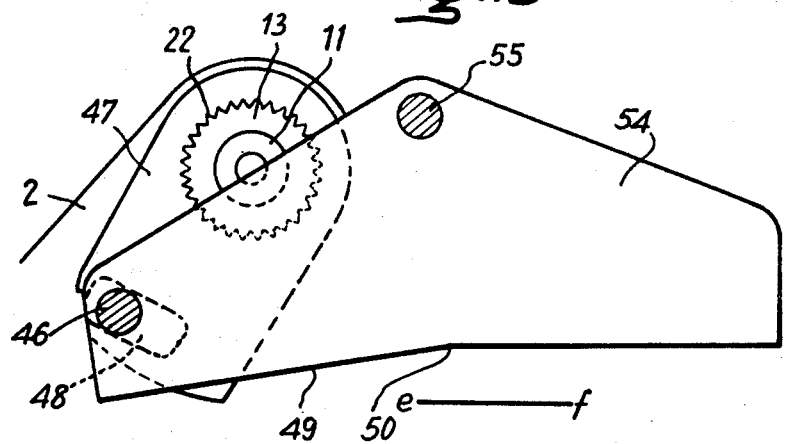
Figure 14:
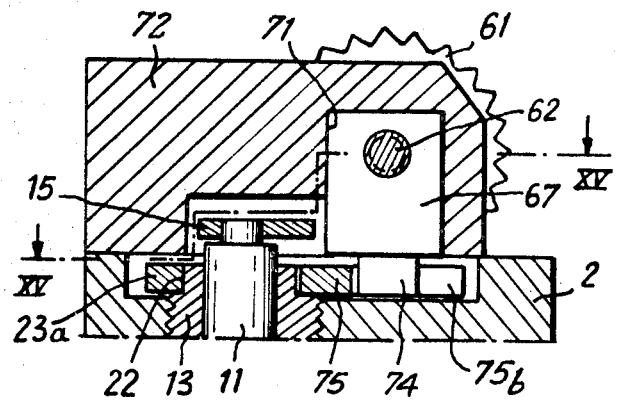
Figure 15:
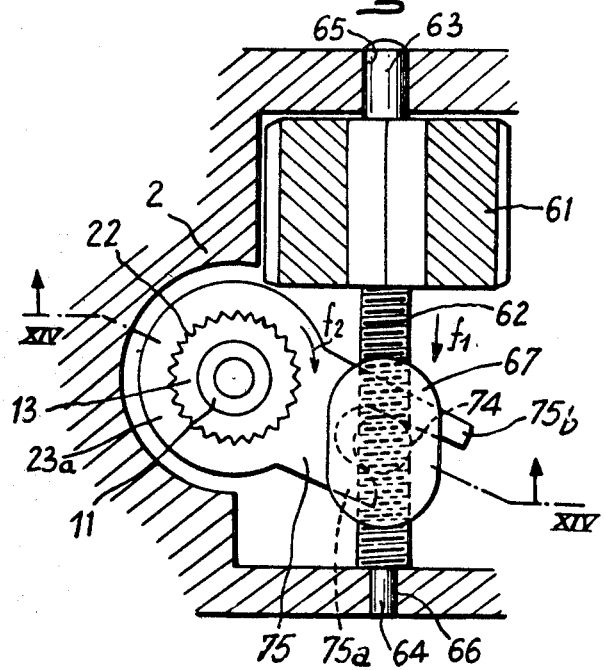

FIGS. 9 13 are fragmentary plan views of four further embodiments;

FIG. 14 is a partial sectional elevational view of still another embodiment;

FIG. 15 is a sectional view through line XV-XV of FIG. 14; and

Figure 16:
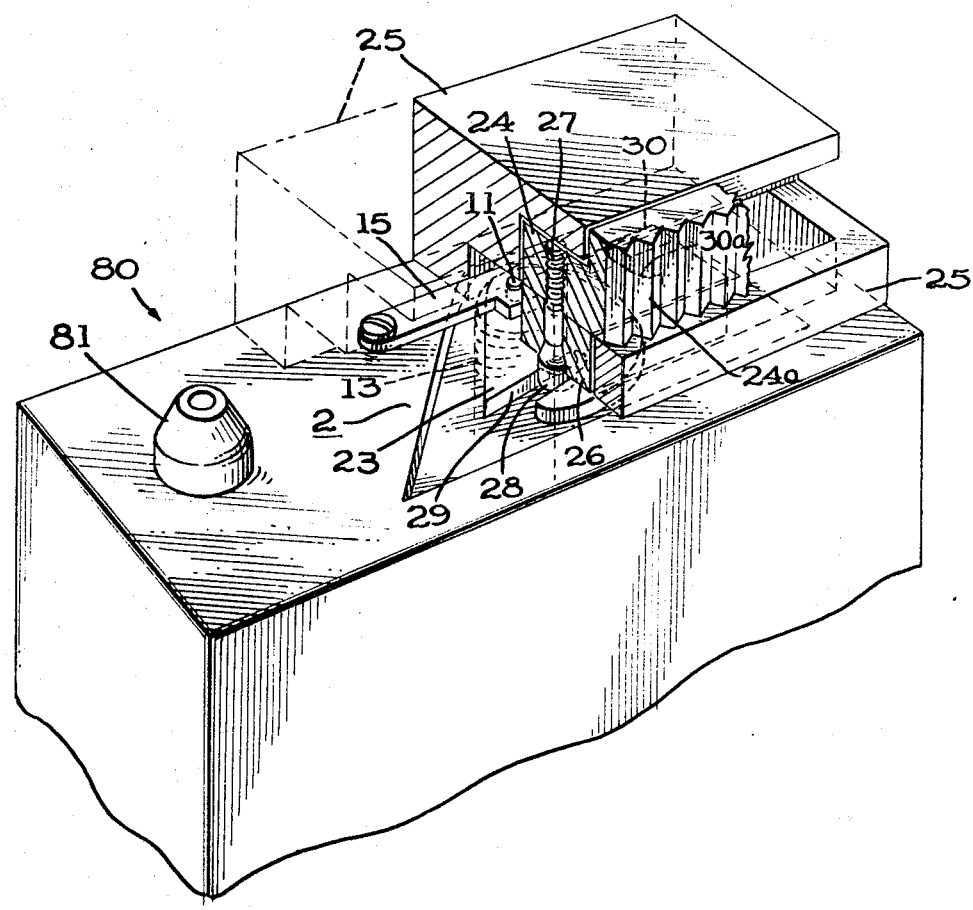

FIG. 16 is an enlarged isometric view of a gas cigarette lighter incorporating the embodiment illustrated in FIGS. 17 with a number of parts broken away for clarity.

In FIG. 1 there is illustrated a valve or pressure reducing system carried in an inner boss 1 formed in the container 2 of a gas cigarette lighter (not illustrated in its entirety). The pressure reducing system includes a tube 3 through which extends a wick 4. The upper end of tube 3 is secured with a force fit inside a tubular support 5 having a collar 6 which rests on a base of a cylindrical chamber 5a formed in the boss 1. Support 5 projects downwardly into the container 2 through an opening in the base of boss 1. Above support 5 there is secured a member 7 including a base, the diameter of which is substantially equal to that of the collar 6 and an upper extension 7a, the diameter of which is considerably smaller than that of chamber 5a. Member 7 terminates in an axial cylindrical projection 7b of a still more reduced diameter. The base of the member 7 is provided with a blind axial bore 16 and with a transverse channel 17 extending across said bore. Onto extension 7a and around projection 7b there is fitted an annular pad 8 of a porous compressible material.

An elastic sealing ring 9 provides a fluid tight packing between the base of the member 7 and the inner wall of the chamber 5a. A plunger 11 is slidingly carried longitudinally of a threaded carrier 13 screwed into the upper opening of chamber 5a. Plunger 11 carries at its lower end an elastic packing 14 adapted to hermetically close the opening of channel 19 extending axially across pressure member 10. Member 10 is held in position by carrier 13 by means of a ball bearing 12. Pressure member 10 compresses both the pad 8 and the ring 9. The plunger 11 controlled by a lever 15 is illustrated in FIG. 1 in its released position into which it is raised with the lever 15 under the action of gas pressure.

The liquid inside the container 2 enters the wick 4 and gasified, passes into the bore 16 and channel 17 so as to reach the pad 8 through the clearance 18 provided between the members 7 and 10, the latter cooperating with plunger 11. The expanded gas flows through the central channel 19, the slot 20 and the lateral channel 21 to a burner (not shown in FIG. 1).

Adjustment of the flame is achieved by rotating carrier 13 in one sense or the other to cause pressure member 10 to be urged against or withdrawn from pad 8, thus compressing the same to a varying extent. The rate of gas flow through pad 8 is a function of the volume thereof.

The means for rotating carrier 13 will now be described.

The upper section of carrier 13 includes a knurled circular portion 22 over which is fitted a driven member or cam follower plate 23 provided with a cam slot 29 (FIGS. 2 and 3).

Referring now to FIGS. 4-7 and 16, inside a slideway 25 affixed to the top of the lighter body, there is mounted for linear reciprocation a slider 26. To the top of slider 26 there is fixedly secured by a screw 27, a block 24 having a knurled exposed surface 24a for manual engagement. The lower terminal portion of screw 27 forms a driving member or cam stud 28 engaging the slot 29 in the cam follower 23.

As clearly shown in FIGS. 2 and 3, the axis ab of the movement of the stud 28 forms with the axis cd of the slot 29 a progressively diminishing angle $\alpha$ as the stud 28 moves from the right to the left, causing follower 23, with which it is in operative engagement, to rotate clockwise.

To each position of the stud 28 there corresponds a position of the cam follower 23 and a value of the angle $\alpha$ which defines the ratio between the linear movement of the stud and the angular movement of the follower. It is apparent that the more the follower 23 approaches its position shown in FIG. 3, the smaller will be the increments of its angular, clockwise displacements as stud 28 moves leftward. Between the driving member (stud 28) and the driven member (follower 23) there is thus provided a stepdown connection, the ratio of which gradually increases as the pressure member 10, urged by the carrier member 13 (which, in turn, is affixed to follower 23), compresses pad 8 to an ever-increasing extent. Stated in different terms, the more pad 8 is compressed and thus the smaller the flame, the lesser will be the further incremental advances of pressure member 10 at given equal displacements of the manually operable block 24. It is thus achieved that when the flame is already small, a further decrease in its height may be effected with a greater fineness of adjustment than when the flame is relatively high.

FIG. 2 shows the stud in its extreme position allowing a maximum gas output. In this position the angle $\alpha$ is at a maximum.

In FIG. 3 the cam stud 28 is shown in its opposite position, where pressure member 10 is near the end of its downward stroke and, pad 8 being considerably compressed, the flow rate of the gas is very small. In this position of stud 28 the angle $\alpha$ is nearly zero. Consequently, any further movement to the left of stud 28 has practically no effect on cam follower 23; the two members are, in fact, operatively disengaged. Thus, no further downward motion of pressure member 10 will occur whereby the crushing and destruction of pad 8 is effectively prevented.

As best shown in FIGS. 6 and 7, the slider 26 includes a shoe 30 adapted to cooperate with a projection 31 on the lever 15. In FIG. 6, where slider 26 is in the position of maximum flow rate, the shoe 30 and the lever 15 are out of contact. On the other hand, as shown in FIG. 7, where the slider 26 is in the position of minimum flow rate, the sloping surface 30a interacts with the projection 31 of lever 15 (FIG. 5). This interaction causes a downward movement of the lever 15 which cuts off entirely the flow of gas by urging plunger 11 against the opening of channel 19 (FIG. 1).

FIG. 16 shows the general arrangement of the parts of the embodiment described hereinabove in connection with FIGS. 1-7 in a perspective view. FIG. 16 illustrates the upper portion of a gas cigarette lighter generally indicated at 80. To the top face of container 2 there is affixed a burner 81 which terminates conduit 21 (FIG. 1). The top face of container 2 is provided with a depression within which there are disposed the cam follower 23 having slot 29, the upper terminal portion of threaded carrier 13 rigidly secured to follower 23 and the upper part of plunger 11 slidable within carrier 13. Slideway 25, fixedly attached to the top of container 2 is shown in broken lines for sake of clarity. Also for reasons of more clearly showing parts 11, 13 and 23, part of lever 15 has been broken away and slider 26 has been omitted altogether.

FIG. 8 illustrates a modification of the precedingly described arrangement. Here the slideway 25a is shaped in such a manner as to be adapted to receive an upwardly extending block 32 having a knurled top face 32a for manual engagement. All other parts may be identical to those of the precedingly described embodiment.

In the embodiment shown in FIG. 9, the cam stud 28 of the first embodiment is replaced here by stud 33 of flat cross section. Stud 33 acts directly on the contoured edge 45 of the cam follower 44 rigidly affixed to the knurled portion 22 of the threaded member 13. The shapes given to the stud 33 and to the edge 45 of the follower 44 are selected so that the cam 28 is shifted away from the follower 44 at the end of its stroke. Thus, shoe 30 on the slider 26 may cooperate with the projection 31 (as described in connection with FIGS. 6 and 7) without any further compression of the pad 8.

Figure 10:
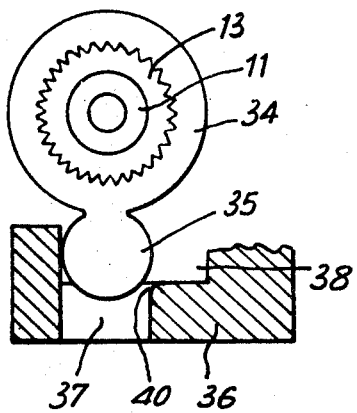
Figure 11:
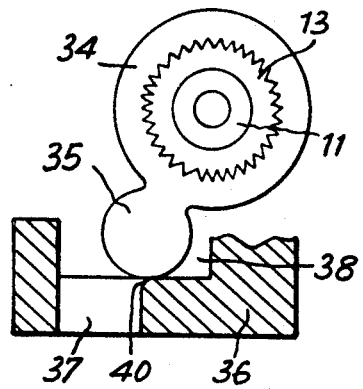

FIGS. 10 and 11 show two extreme positions of further means adapted to control the threaded member 13 by means of a slider. Here there is provided a driven member or lever plate 34 carrying a pin 35 cooperating with the slider 36 provided with a recess at 37 and with a relieved section at 38.

When in the position allowing maximum flow rate, as illustrated in FIG. 10, the pin 35 is disposed inside the recess 37. Upon shifting of the slider, the driving member or cam edge 40 of recess 37 shifts the pin 35 and thereby causes a clockwise movement of the plate 34. As seen in FIG. 10, the edge 40, at the beginning of its linear movement to the left, first engages the side of pin 35 provided with an arcuate contour. During the course of the displacement to the left of slider 36, the edge 40, in contact with pin 35, gradually travels along its arcuate contour as plate 34 rotates clockwise. Similarly to the structure described with reference to FIGS. 2 and 3, a certain displacement of edge 40 will cause a gradually lesser displacement of plate 34. There is thus a step-down connection of variable ratio established between the manually operable slider 36 and carrier member 13 as pin 35 approaches its position of FIG. 11. At the end of the stroke (as illustrated in FIG. 11) the angular movement of plate 34 is discontinued as the pin 35 slides into the relieved section 38. Thus, in fact, edge 40 and pin 35 become operatively disengaged; further tangential movement of edge 40 with respect to pin 35 will not cause further rotation of plate 34.

Figure 12:
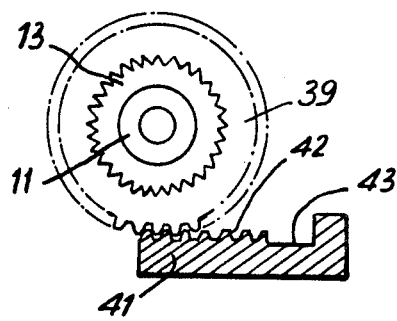

In the embodiment illustrated in FIG. 12, the threaded member 13 is rigid with a driven member or pinion 39 controlled by a driving member or rack 42 cut in the side of the slider 41. At the end of its stroke, the rack is no longer operative by reason of its end being relieved at 43 for the purpose of preventing the crushing of the pad 8. Thus, as the slider 41 approaches its extreme position during its displacement to the left, the last tooth of rack 42 adjacent the relieved portion 43 will become gradually disengaged from pinion 39.

In a further embodiment shown in FIG. 13, the threaded member 13 is rigidly affixed to a driven member or linkage plate 47 provided with a slot 48. A lever 54 pivotally secured to the spindle 55 carries a driving member or stud 46 engaging the slot 48. The inner edge 49 of the lever 54 forms an obtuse angle, the apex 50 of which is flush with the surface of the lighter body (not shown).

The operator may adjust the flame by sliding his finger from e to f or from f to e. The magnitude of the angle formed by the axis of the slot 48 and the tangent to the arc of a circle described by the stud 46 about the axis of the spindle 55 defines the ratio between the two angular movements. It will be apparent from FIG. 13 that, due to the arrangement of slot 48, a certain arcuate displacement of stud 46 will cause a gradually lesser arcuate displacement of plate 47. There is thus a step-down connection of variable ratio established between the manually operable lever 54 and carrier member 13. As plate 47 reaches a predetermined position in its clockwise rocking motion, the arc of any further displacement of stud 46 will coincide with the profile of slot 48. Consequently, at and beyond said position an operative disengagement occurs between the stud 46 and the slot 48. As a result, a further clockwise motion of manually operable plate 54 will not cause any further displacement of linkage plate 47.

In a still further embodiment illustrated in FIGS. 14 and 15, the threaded carrier member 13 is rotated by a knurled wheel 61 coaxially keyed to a worm 62 having stubs 63 and 64 disposed for journaling in corresponding cylindrical openings 65 and 66 formed in the body of the container 2. On the worm 62 there is mounted a traveler 67 slidably received inside a slideway 71 formed in the cover 72.

The traveler 67 carries a driving member or cylindrical stud 74 engaged between the tines 75a and 75b of a fork 75 integral with a driven member or plate 23a which, in turn, is rigidly secured to carrier member 13.

Thus, when the knurled control wheel 61 is caused to rotate in either direction, the traveler 67 is advanced inside the slideway 71, whereby the stud 74 drives the fork 75 and thus rotates member 13. The linear displacement of traveler 67 in the direction indicated by the arrow $f_1$ and the rotation defined by the arrow $f_2$ causes a compression of the pad 8 as described in connection with FIGS. 1-7. To prevent crushing of pad 8, the length of the arm 75a of the fork 75 against which the stud 74 is engaged during the pressure stroke of pressure member 10 (FIG. 1), is sufficiently short so that stud 74 may slide off the end of arm 75a and may continue freely its travel without carrying with it the fork 75 and consequently without driving the rotary member 13 beyond a predetermined angular position corresponding to the maximum allowable compression of the pad 8. When the knurled wheel 61 is rotated so as to move traveler 67 in a direction opposed to the arrow $f_1$, the stud 74 returns into its position inside the fork 75 so as to engage the arm 75b and to drive the latter in the direction opposed to the arrow $f_2$. It is seen from FIG. 15 that due to the worm gear arrangement in this embodiment a certain angular motion of manually operable wheel 61 will cause a gradually lesser angular displacement of plate 23a. Thus, a step-down connection of variable ratio is established between wheel 61 and carrier member 13.

Summarizing the basic operation of the embodiments described in detail hereinabove, the invention provides a manual control member mounted on the upper part of a gas cigarette lighter. This manual control member may be a linearly slidable unitary assembly (24, 26 in FIG. 4, 26, 32 in FIG. 8, 36 in FIGS. 10, 11 and 41 in FIG. 12), a rocker plate (54 in FIG. 13) or a worm and traveler assembly (FIGS. 14 and 15). The manual control member is operatively connected to a threaded carrier 13 causing the latter to rotate and, depending on the sense of its rotation, urge pressure member 10 against, or allow the same to move away from, pad 8. The operative engagement between a driving member (associated with the manual control member) and a driven member (affixed to carrier member 13) is maintained until the manually operable member reaches a predetermined position which defines a maximum permissible compression for pad 8. At and beyond this position the driving member and the driven member are operatively disengaged so that a continuing motion of the driving member in the same direction will not cause further displacement of carrier member 13. Prior to total disengagement between driving member and driven member there is provided a step-down connection, the ratio of which gradually increases as total disengagement is approached.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. In a gas flow metering valve of the type including a valve chamber, a compressible pad of porous material in the path of said gas flow, pressure means adapted to be advanced toward or moved away from said compressible pad to decrease or increase its volume, respectively, a carrier member threadedly engaged in said chamber and adapted to be rotatingly advanced into or retracted from said chamber to urge said pressure means against said pad or allow said pressure means to move away therefrom, respectively, manually operable control means, step-down connecting means linking said manual means with said carrier member to impart to said carried member a motion of lesser length than the displacement of said manual means when the latter is actuated, the improvement in said connecting means comprising a driven member affixed to said carrier member and movable therewith as a unit, a driving member movable by said manual means and being normally in operative engagement with said driven member to cause displacement thereof when said manual means is moved, said driving member and said driven member adapted to become operatively disengaged in and beyond a predetermined position of said manual means, said position defining a maximum compression of said porous pad.

2. In a gas flow metering valve of the type including a valve chamber, a compressible pad of porous material in the path of said gas flow, pressure means adapted to be advanced toward or moved away from said compressible pad to decrease or increase its volume, respectively, a carrier member threadedly engaged in said chamber and adapted to be rotatingly advanced into or retracted from said chamber to urge said pressure means against said pad or allow said pressure means to move away therefrom, respectively, manually operable control means, step-down connecting means linking said manual means with said carrier member to impart to said carrier member a motion of lesser length than the displacement of said manual means when the latter is actuated, the improvement in said connecting means comprising a driven member affixed to said carrier member and movable therewith as a unit, a driving member movable by said manual means and being in operative engagement with said driven member to cause displacement thereof when said manual means is moved, said step-down connecting means between said driving member and said driven member being of a variable ratio, said ratio increasing as said carrier member is advanced in said chamber to gradually decrease incremental displacements of said carrier member caused by the movements of said manual means.

3. In a gas flow metering valve as defined in Claim 2, wherein beyond a predetermined position of said manual means said ratio assumes an infinitely large value so that the position of said driven means is unaffected by movements of said manual means beyond said predetermined position, means permitting said driving member to be displaced in response to movements of said manual means beyond said predetermined position.

4. A valve as defined in Claim 3, wherein said manual control means is linearly reciprocable.

5. A valve as defined in Claim 4, wherein said driving member includes a rack rigidly affixed to said manual control means, and said driven member includes a pinion gear coaxially and rigidly affixed to said carrier and normally meshed with said rack.

6. A valve as defined in Claim 5, wherein said rack includes a relieved portion to disengage said rack from said pinion when said pressure means reaches a predetermined maximum advanced position.

7. A valve as defined in Claim 4, wherein said driving member includes a cam rigidly affixed to said manually operable means and said driven member includes a cam follower engageable by said cam and rigidly affixed to said carrier.

8. A valve as defined in Claim 3, wherein said driving member includes a cylindrical stud and said driven member includes a plate provided with a slot normally operatively engaged by said stud to rotate said plate and said carrier when said manually operable means is actuated.

9. A valve as defined in Claim 3, wherein said manually operable means includes a lever rockable about an axis parallel to that of said carrier, said driving member includes a stud fixedly secured to said lever, and said driven member includes a linkage plate fixedly secured to said carrier, said linkage plate being provided with a slot normally operatively engaged by said stud to impart an angular movement to said plate and said carrier.

10. A valve as defined in Claim 9, wherein said lever includes an a manually engageable portion comprising a pair of edges disposed at an obtuse angle with respect to one another.

11. A valve as defined in Claim 3, wherein said manually operable means includes a manually rotatable knurled wheel, said connecting means includes a worm rotatable by said wheel, a traveler mounted on and threadedly engaged by said worm and adapted to linearly reciprocate when said worm rotates, said driving member includes a stud rigidly secured to said traveler, said driven member includes a plate rigidly affixed to said carrier and provided with a fork, said stud being adapted to engage said fork to cause rotation of said plate and said carrier when said traveler reciprocates.

12. A valve as defined in Claim 4, wherein said driven member includes a plate rigidly affixed to said carrier member, a pin integral with said plate and projecting beyond the contour thereof, said pin having an arcuate profile, said driving member includes a cam edge normally operatively engaging said pin to rotate said plate and said carrier member when said manually operable member is moved.

PO-1050
(5/69)

UNITED STATES PATENT OFFICE
CERTIFICATE OF CORRECTION

Patent No. 3,523,558      Dated August 11, 1970

Inventor(s) Lucien Francois Simon Tissot-Dupont, deceased

It is certified that error appears in the above-identified patent and that said Letters Patent are hereby corrected as shown below:

Col. 2, line 38, "Figs. 15" should read --Figs. 1-5--; line 41, "Figs. 913" should read --Figs. 9-13--; line 49, "17" should read --1-7--
Col. 6, line 19, "carried" should read --carrier--
Col. 7, line 19, "an" should be deleted

SIGNED AND
SEALED
NOV 10 1970

(SEAL)
Attest:

Edward M. Fletcher, Jr.
Attesting Officer

WILLIAM E. SCHUYLER, JR.
Commissioner of Patents